(12) United States Patent
Weinberger et al.

(10) Patent No.: US 8,016,081 B2
(45) Date of Patent: Sep. 13, 2011

(54) ELEVATOR DRIVE BRAKE DEVICE MONITOR

(75) Inventors: Karl Weinberger, Immensee (CH); Rudolf Eckenstein, Baar (CH); Rene' Hermann, Lucerne (CH); Luc Bonnard, Hergiswil (CH)

(73) Assignee: Inventio AG, Hergiswil NW (CH)

( * ) Notice: Subject to any disclaimer, the term of this patent is extended or adjusted under 35 U.S.C. 154(b) by 647 days.

(21) Appl. No.: 12/139,888

(22) Filed: Jun. 16, 2008

(65) Prior Publication Data

US 2008/0308360 A1 Dec. 18, 2008

Related U.S. Application Data

(60) Provisional application No. 60/944,585, filed on Jun. 18, 2007.

(30) Foreign Application Priority Data

Jun. 18, 2007 (EP) ..................................... 07110428

(51) Int. Cl.
*B66B 1/34* (2006.01)
(52) U.S. Cl. .................................. 187/393; 188/1.11 E
(58) Field of Classification Search .................. 187/277, 187/287, 288, 351, 356, 367; 188/1.11 E
See application file for complete search history.

(56) References Cited

U.S. PATENT DOCUMENTS

| 4,132,292 A | 1/1979 | Dufresne |
| 4,232,768 A | 11/1980 | Dufresne |
| 4,984,659 A * | 1/1991 | Nomura ......................... 187/288 |
| 7,398,863 B2 * | 7/2008 | Liebetrau et al. ............. 187/367 |
| 2008/0128218 A1 * | 6/2008 | Gremaud et al. ............. 187/250 |

FOREIGN PATENT DOCUMENTS

| EP | 1 101 971 A1 | 5/2001 |
| EP | 1 156 008 B1 | 11/2001 |
| GB | 1 581 381 A | 12/1980 |
| JP | 05193858 A * | 8/1993 |

* cited by examiner

*Primary Examiner* — Jonathan Salata
(74) *Attorney, Agent, or Firm* — Fraser Clemens Martin & Miller LLC; William J. Clemens

(57) ABSTRACT

An elevator drive with a brake device has compression springs that act on brake levers, whereby brake linings generate a brake force on a brake drum. The more the brake linings wear due to abrasion, the smaller the distance of the plunger from the brake magnet housing becomes. Should the plunger come into contact with the brake magnet housing, the braking capacity of the brake linings is completely eliminated creating an operating condition that is dangerous for elevator users. A switch is provided that detects a minimum distance. The switch can be arranged on the plunger of the brake magnet and detect the minimum distance to the brake magnet housing or, in the case of a retrofit, the switch can be arranged on the brake magnet rod and, for example, detect the distance of the second joint from the brake magnet housing, and at the minimum distance the switch switches.

15 Claims, 4 Drawing Sheets

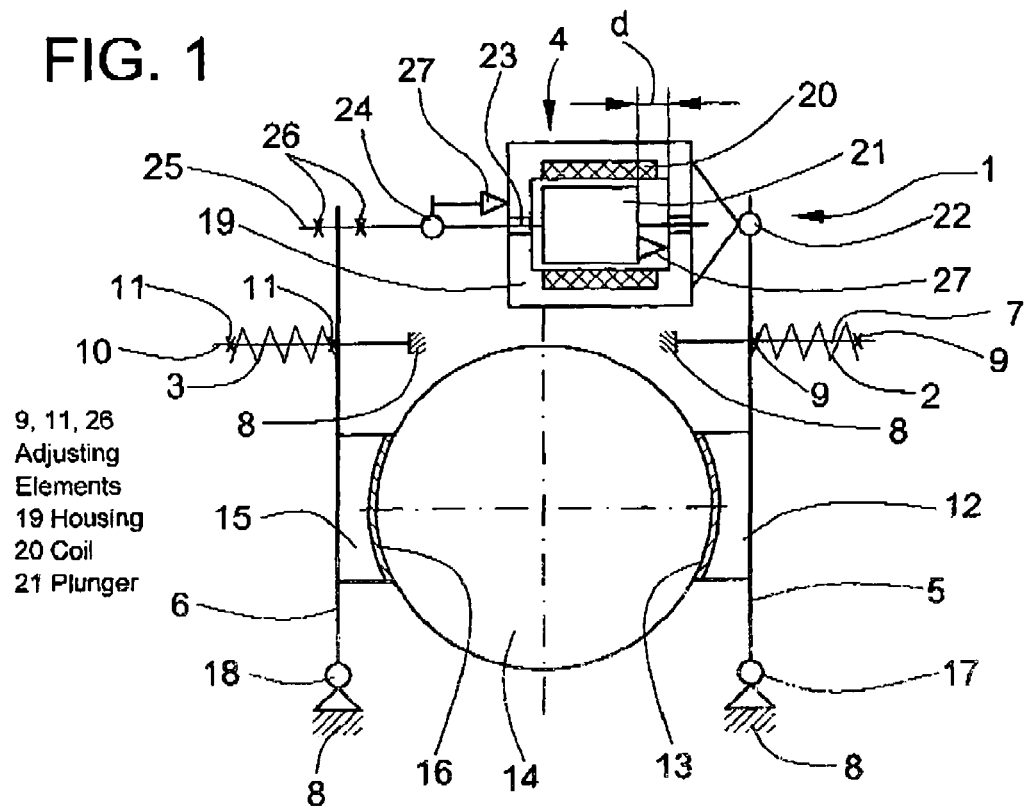
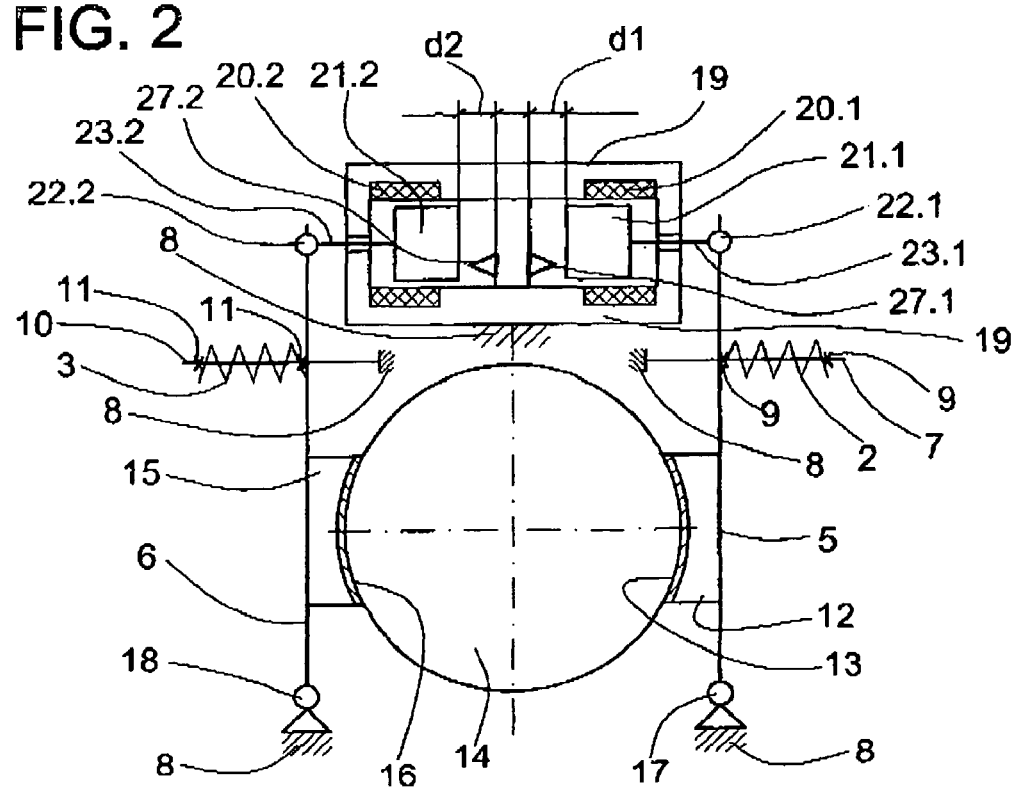

US 8,016,081 B2

ELEVATOR DRIVE BRAKE DEVICE MONITOR

CROSS-REFERENCE TO RELATED APPLICATION

This application claims the benefit of U.S. provisional patent application Ser. No. 60/944,585 filed Jun. 18, 2007.

FIELD OF THE INVENTION

The invention relates to a method and an elevator drive with a brake device consisting of a brake lever with compression springs which exert on the latter a spring force, whereby brake linings cause a braking force on a brake drum and at least one brake magnet lifts the brake lever against the spring force.

BACKGROUND OF THE INVENTION

From patent specification EP 1 156 008 B1 a brake device for a drive machine has become known. The brake device consists of a first brake lever and a second brake lever, arranged on each of which is a brake shoe that acts on a brake drum. At their lower ends the brake levers are supported in swivel bearings on a bearing pedestal and at their upper ends guided by a bar. For the purpose of actuating the brake shoes, a compression spring is provided for each brake lever. For the purpose of lifting the brake shoes, provided on each brake lever is a magnet that acts against the compression spring. The magnets are arranged on a frame that is joined to the bearing pedestal. Arranged on the inside of each magnet support is a microswitch. A pin of the microswitch is actuated by means of a cam that is arranged on a plunger disk. The switching status of the microswitch indicates to the control of the elevator whether the brake is activated by means of the compression springs or released by means of the magnets.

SUMMARY OF THE INVENTION

The present invention solves the problem of creating a method and an elevator drive with a safely acting brake device that prevents conditions that are dangerous for the users of the elevator.

The main advantages derived from the present invention are that not only is the position of the brake lever in the released state as brought about by the brake lever monitored as hitherto, but also the end position of the brake magnet rod and of the plunger of the brake magnet. By this means, the possibility is avoided of the brake magnet rod or brake magnet plunger coming into contact with the brake magnet housing through gradual abrasion of the brake linings and thereby reducing, or in the extreme case eliminating, the braking capacity of the brake device. The elevator drive can thus be directly switched off before the brake fails or before a condition that is dangerous for the users of the elevator can occur.

A further advantage is the simple construction of the end-position monitoring that can be realized, for example, by means of limit-value switch, microswitch, or proximity switch.

With the present invention, an elevator drive can be advantageously constructed and also an existing elevator drive advantageously retrofitted. The switch can be arranged inside or outside the brake magnet housing, in either case the movement of the brake magnet rod or of the plunger relative to the brake magnet housing being registered.

With the simple construction of the end-position monitoring, existing elevator systems can be retrofitted with the device according to the present invention without great outlay, for example by mounting the switch on the brake magnet rod.

In the elevator drive according to the present invention with a braking device consisting of a brake lever to which a spring force is applied by means of compression springs, brake linings cause a braking force on a brake drum and at least one brake magnet lifts the brake lever against the spring force, at least one switch being provided that monitors a minimal distance between a plunger of the brake magnet and a brake magnet housing.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a diagrammatic illustration of an elevator drive with a brake device with two compression springs and a brake magnet; according to the present invention;

FIG. 2 is a diagrammatic illustration of an elevator drive with a brake device with a double brake magnet according to the present invention;

DESCRIPTION OF THE PREFERRED EMBODIMENT

Figure 3:
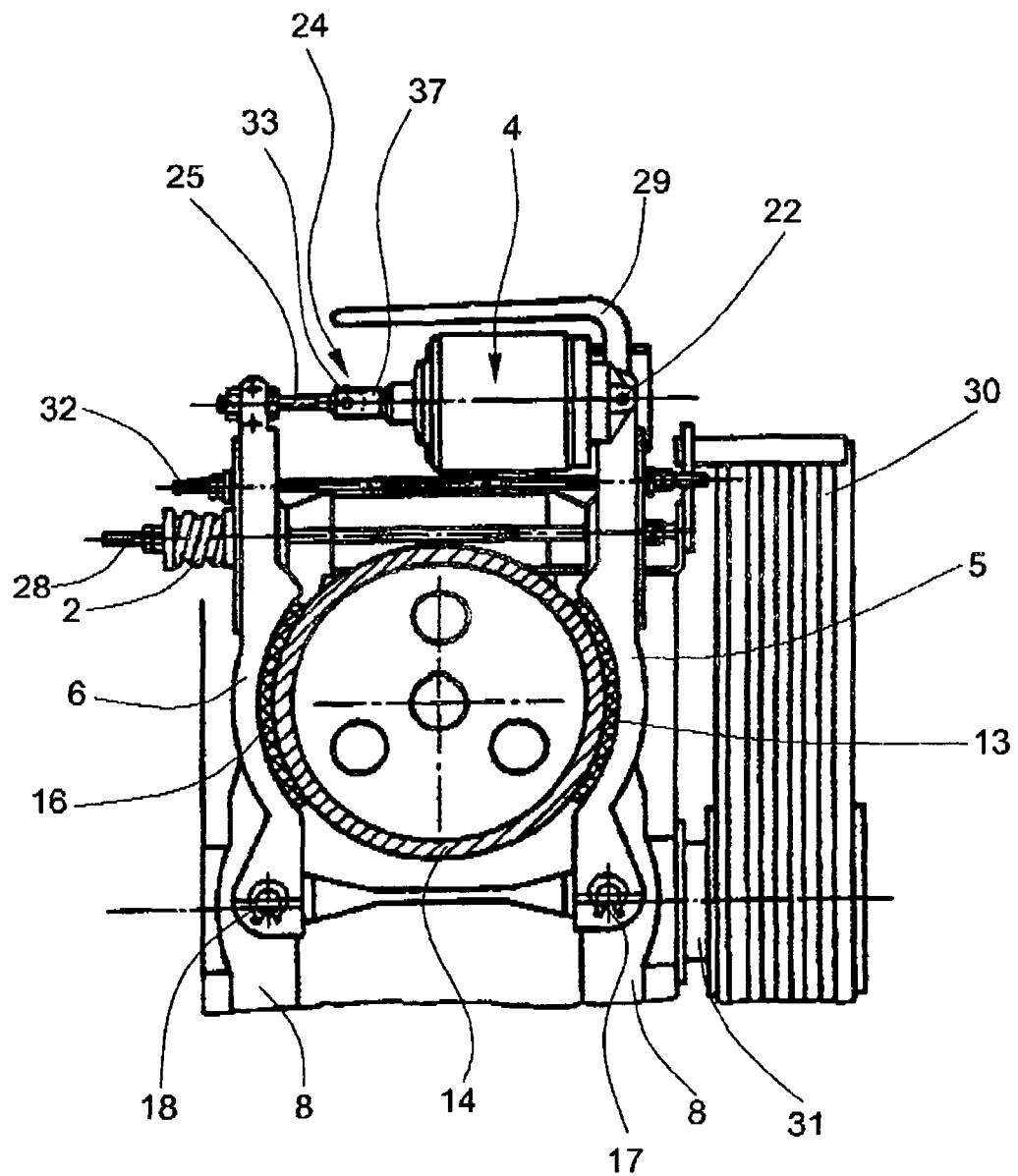
FIG. 3 is a variant embodiment of an elevator drive with a brake device with a compression spring and a brake magnet according to the present invention.

The U.S. provisional patent application Ser. No. 60/944, 585 filed Jun. 18, 2007 is hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 shows diagrammatically a brake device 1 with a first compression spring 2, a second compression spring 3, a first brake lever 5, a second brake lever 6, and a brake magnet 4. The first compression spring 2 exerts a spring force on the first brake lever 5. The second compression spring 3 exerts a spring force on the second brake lever 6. The first compression spring 2 is guided by means of a first bar 7 which at one end is joined to a machine housing 8 and at the other end has a first adjusting element 9, for example nuts with locknuts mounted on threads of bar 7, the braking force and the opening of the first brake lever 5 being settable with the adjusting element 9. This second compression spring 3 is guided by means of a second bar 10 which at one end is joined to the machine housing 8 and at the other end has a second adjusting element 11, for example locknuts mounted on threads of bar 10, the braking force and the opening of the second brake lever 6 being settable with the adjusting element 11. Arranged on the first brake lever 5 is a first brake shoe 12 that carries a first brake lining 13, the first brake lining 13 creating a braking force on a brake drum 14. Arranged on the second brake lever 6 is a second brake shoe 15 that carries a second brake lining 16, the second brake lining 16 creating a braking force on the brake drum 14. The first brake lever 5 is mounted in swiveling manner on a first lever axle 17 that is supported on the machine housing 8. The second brake lever 6 is mounted in swiveling manner on a second lever axle 18 that is supported on the machine housing 8. The brake drum 14 is usually joined to a motor shaft that is not shown.

The brake magnet 4 consists of a magnet coil 20 that is arranged in a brake magnet housing 19 which, when carrying electric current, acts on a plunger 21, the brake magnet housing 19 with the magnet coil 20 and the plunger 21 repelling each other and acting against the spring force of the compression springs 2, 3. At a first joint 22, the brake magnet housing 19 is connected to the first brake lever 5. The plunger 21 is connected to a brake magnet rod 23 which in turn is connected to a second joint 24 with a third bar 25. By means of third adjustment elements 26, the third bar 25 is connected to the second brake lever 6.

Figure 4:
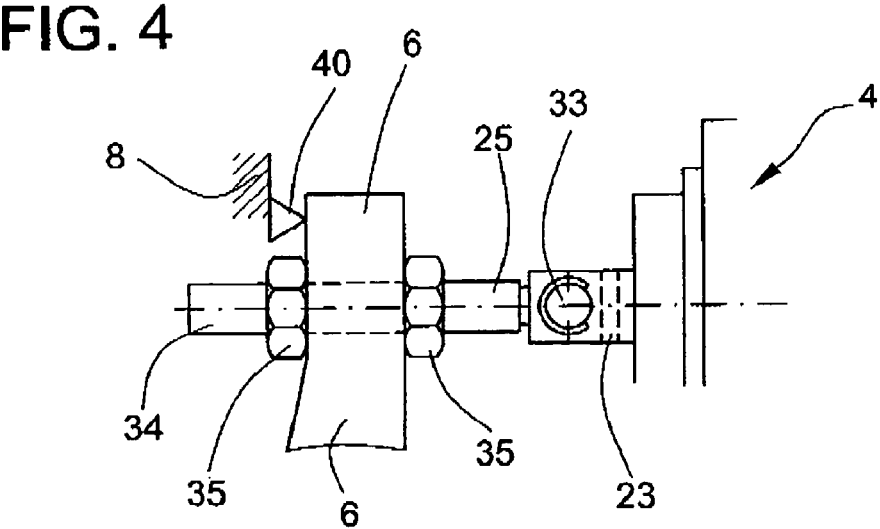
FIG. 4 shows details of a connection of a brake magnet rod with a brake lever.
Figure 5:
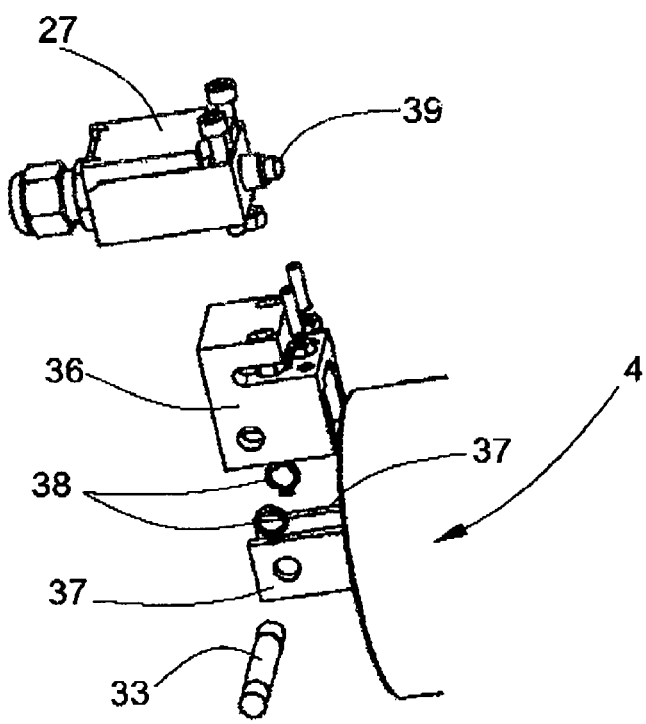
FIGS. 5 and 6 show details of a switch that is mounted on the brake magnet rod for monitoring the end position of the rod.
Figure 6:
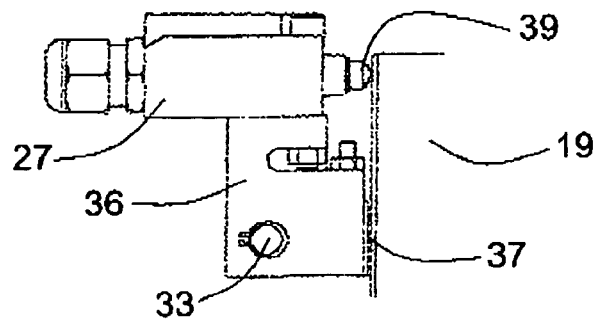

The more the brake linings 13, 16 wear due to abrasion, the smaller the distance d of the plunger 21 from the brake magnet housing 19 becomes. Should the plunger 21 come into contact with the brake magnet housing, the braking capacity of the brake linings 13, 26 is completely eliminated. So that this operating condition that is dangerous for elevator users cannot occur, at least one switch 27 is provided that detects a minimum distance d. Provided as switch 27 can be, for example, a limit value switch or a microswitch or a proximity switch or an optical switch. The switch 27 can be arranged on the plunger 21 and detect the minimum distance d to the brake magnet housing 19. The switch 27 can also be arranged on the brake magnet housing 19 and detect the minimum distance d to the plunger 21. The switch 27 can also be arranged on the brake magnet rod 23 and execute the relative movement of the brake magnet rod 23 relative to the brake magnet housing 19, the switch 27 switching at the minimum distance d. Further details are explained in FIGS. 4 to 6. The switch arrangement according to FIGS. 4 to 6 is preferred for retrofitting in existing elevator installations. For new installations, a brake magnet 4 with a built-in switch 27 is normally used.

FIG. 2 shows diagrammatically a brake device 1 with a double brake magnet 4 consisting of a first magnet coil 20.1, a second magnet coil 20.2, a first plunger 21.1, a second plunger 21.1, a first brake magnet rod 23.1, and a second brake magnet rod 23.2. The first brake magnet rod 23.1 is joined (joint 22.1) to the first brake lever 5. The second brake magnet rod 23.2 is joined (joint 22.2) to the second brake lever 6. The brake magnet housing 19 is joined to the machine housing 8. A first switch 27.1 monitors the minimum distance d1 between the first plunger 21.1 and the brake magnet housing 19. A second switch 27.2 monitors the minimum distance d2 between the second plunger 21.2 and the brake magnet housing 19. The first switch 27.1 can also be arranged on link 22.1. The second switch 27.2 can also be arranged on link 22.2.

FIG. 3 shows a variant embodiment of a brake device 1 with only one compression spring 3 and one brake magnet 4. The compression spring 3 rests against the second brake lever 6 and on a fourth bar 28 which at its other end is connected to the first brake lever 5. The compression spring 3 thus exerts a spring force on both brake linings 13, 16. The brake magnet 4 functions as explained in FIG. 1, it being possible for at least one switch 27 to be built into the brake magnet 4 or, as shown in FIGS. 4 to 6, subsequently mounted on the second joint 24. The brake magnet 4 acts against the spring force of compression spring 3 and releases the brake linings 13, 16 from the brake drum 14. The force of the brake magnet 4 can also be created manually by means of a brake release lever 29. A fifth bar 32 limits the displacement of the brake levers 5, 6 by the magnet 4 or by the brake release lever 29. Arranged on a gear output shaft 31 and referenced with 30 is a traction sheave over which suspension and traction means of the elevator car and counterweight are guided.

FIG. 4 shows details of the connection of the brake magnet rod 23 with the second brake lever 6. By means of a pin 33 that penetrates through the brake magnet rod 23, the third bar 25 is joined to the brake magnet rod 23. Provided at the end of the third bar 25 is a thread 34 which together with nuts 35 serves as third adjusting element 26. At least one brake lever switch 40 monitors the position of the brake levers 5, 6 or whether the brake levers 5, 6 and therefore the brake linings 13, 16 have been released from the brake drum 14.

FIG. 5 and FIG. 6 show details of the switch 27 that is connected to the brake magnet rod 23 to monitor the rod end position or minimum distance d. An adapter 36 is mounted on the fork-shaped end 37 of the brake magnet rod 23 and fastened by means of the pin, spring rings 38 securing the pin at both ends. The switch 27, in the example shown a limit value switch 27 with sensor head 39, is borne by the adapter 36. As shown in FIG. 6, the sensor head 39 registers the movement of the brake magnet housing rod 23 relative to the brake magnet housing 19.

Figure 7:
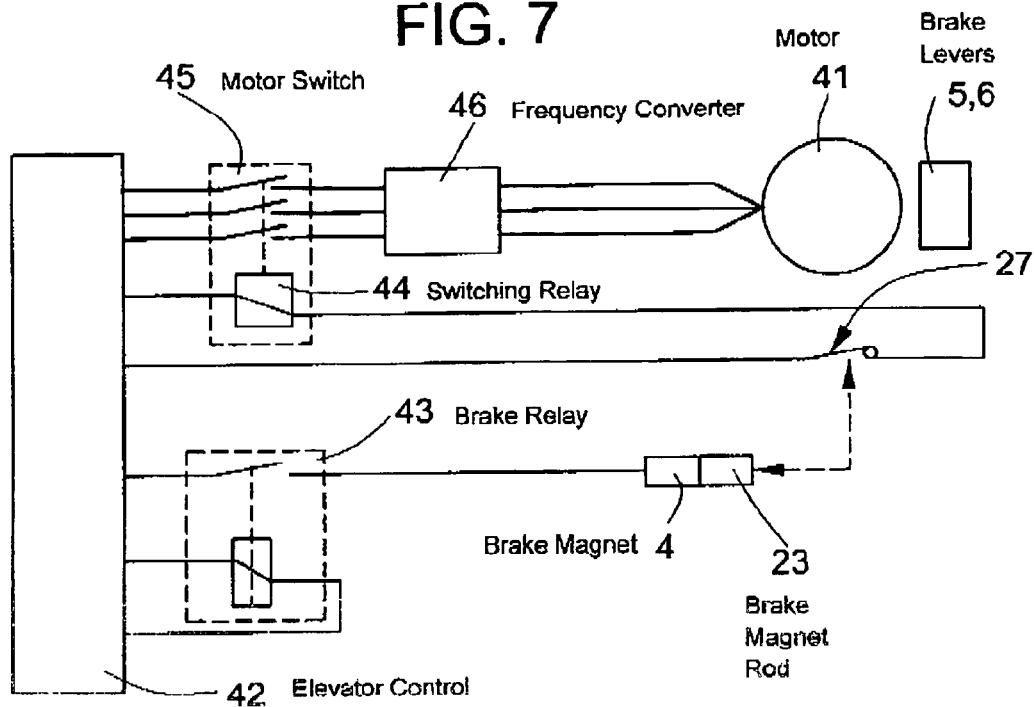
FIG. 7 is a diagram of an electric circuit for controlling the drive machine depending on the end position switch.

FIG. 7 shows a diagram of an electric circuit for controlling the drive machine or a motor 41 that drives the traction sheave 30 depending on the switch 27. An elevator control 42 energizes or triggers a brake relay 43 as soon as the elevator car is ready to begin travel. The brake relay 43 feeds the magnet coil 20 of the brake magnet 4, the brake lever 5, 6 being thereby lifted. Simultaneously, the elevator control 42 energizes or switches a switching relay 44 that switches a 3-pole motor switch 45 on, whereby a frequency converter 46 is supplied with current and the traction sheave 30 set in motion. The switch 27 for monitoring the end position of the brake magnet rod 23 is included in the feeding circuit of the switch relay 44 and, in the normal case as shown, closed. Should the brake magnet rod 23 or the plunger 21 due to excessively worn brake linings 13, 16 come closer to the brake magnet housing 19 than the minimum distance d, the switch 27 is opened and the supply of electric current to the switch relay 44 and thus the supply of electric current to the frequency converter 46 is interrupted independent of the elevator control 42. The motor 41 remains switched off and cannot be switched on again without the intervention of the maintenance personnel.

On elevators with many short trips and/or that stop at many floors, the brake linings 13, 16 can wear more quickly than usual. Elevators that are slowed by the brake in the area of the story (so-called two-speed elevators), have higher wear of the brake linings. However, an inadequate condition of the brake can be promptly deduced from the diminishing leveling accuracy of the elevator car on the story. With drives with releveling, the leveling accuracy is always the same, an inadequate condition of the brake does not manifest itself visibly.

A further cause of excessive wear of the brake linings 13, 14 can be an at least partial failure of the magnet coil 20, as a consequence of which the magnet coil 20 no longer produces the full force for releasing the brake lever 5, 6 and the motor 41 moves the traction sheave 30 with closed brake levers 5, 6. As shown in FIG. 4, to avoid this condition with excessive wear of the brake linings 13, 16, a brake lever switch 40 is provided that monitors the position of the brake levers 5, 6 when the brake is perceived by the elevator control to be open and determines whether on a travel command the brake levers 5, 6 and thus the brake linings 13, 16 have been released from the brake drum 14. Should the brake lever switch 40 not be present, or not supported by the elevator control, travel without released brake cannot be avoided, but the switch 27 still detects and prevents total failure of the brake.

Figure 8:
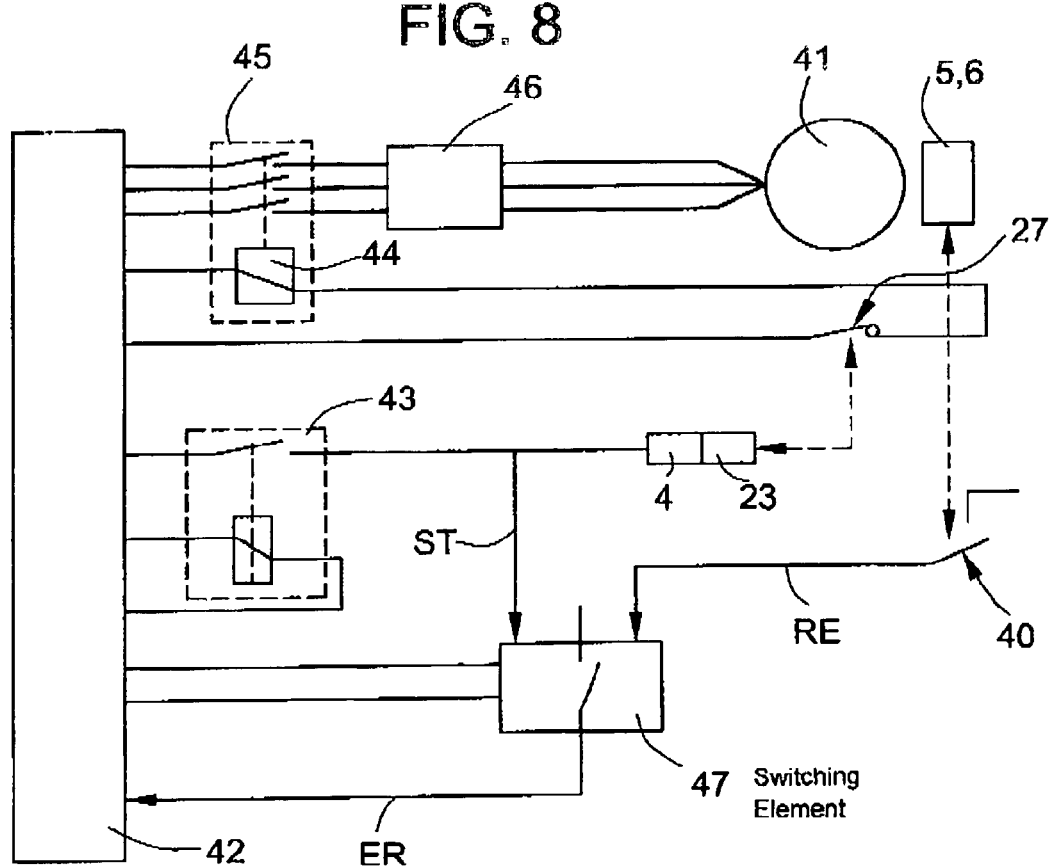
FIG. 8 is a diagram of an electric circuit for controlling the drive machine depending on the end-position switch and for controlling the elevator depending on a brake lever switch.

FIG. 8 shows the electric circuit diagram of FIG. 7 for controlling the motor 41 depending on the switch 27 and for controlling the elevator depending on the brake lever switch 40. A signal ST that is generated by the brake relay 43, and also energizes the brake magnet coil 20 of the brake magnet 4, starts a switching element 47. In the normal case, the brake magnet 4 acts against the spring force of the compression springs 2, 3, and the brake lever switch 40 detects the condition of the opened, or lifted, brake levers 5, 6, a signal RE resetting the time relay. Should the brake lever 5, 6 not be lifted despite energized brake magnet 4, the brake lever switch 40 does not generate the signal RE. A circuit-logical inequality between the signals ST and RE thus results. Without the signal RE, the switching element 47 is not reset and a signal ER is forwarded to the elevator control 42 as fault message, which in this case allows the elevator car to travel to the next floor and then switches off the frequency converter 46 and opens the doors.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator drive with a brake device having brake levers with compression springs that exert a spring force to move brake linings to cause a braking force on a brake drum and at least one brake magnet that lifts the brake levers against the spring force, comprising at least one switch for monitoring a minimum distance between a plunger of the at least one brake magnet and a brake magnet housing and controlling the elevator drive upon detection of the minimum distance.

2. The elevator drive according to claim 1 wherein said at least one switch is arranged on a brake magnet rod and executes movement of the said brake magnet rod relative to said brake magnet housing, said at least one switch switching at the minimum distance.

3. The elevator drive according to claim 1 wherein said at least one switch is arranged on said plunger of the at least one brake magnet and detects the minimum distance to said brake magnet housing.

4. The elevator drive according to claim 1 wherein said at least one switch is arranged on said brake magnet housing and detects the minimum distance to said plunger of the at least one brake magnet.

5. The elevator drive according to claim 1 wherein upon falling below the minimum distance, said at least one switch switches off the elevator drive immediately.

6. The elevator drive according to claim 1 including at least one brake lever switch for monitoring a position of the brake levers.

7. The elevator drive according to claim 6 including a switching member for comparing a signal that energizes the at least one brake magnet with a signal of said at least one brake lever switch and on circuit-logical inequality generates an error signal for an elevator control.

8. An elevator with an elevator drive according to claim 1.

9. An elevator drive with a brake device having brake levers with compression springs that exert a spring force to move brake linings to cause a braking force on a brake drum, comprising:
at least one brake magnet that lifts the brake levers against the spring force;
at least one switch for monitoring a minimum distance between a plunger of the at least one brake magnet and a brake magnet housing; and
a motor rotating the brake drum, said at least one switch disconnecting electric current from said motor upon detection of the minimum distance.

10. The elevator drive according to claim 9 wherein said at least one switch is arranged on a brake magnet rod and executes movement of the said brake magnet rod relative to said brake magnet housing, said at least one switch switching at the minimum distance.

11. The elevator drive according to claim 9 wherein said at least one switch is arranged on said plunger of the at least one brake magnet and detects the minimum distance to said brake magnet housing.

12. The elevator drive according to claim 9 wherein said at least one switch is arranged on said brake magnet housing and detects the minimum distance to said plunger of the at least one brake magnet.

13. The elevator drive according to claim 9 wherein upon falling below the minimum distance, said at least one switch switches off the elevator drive immediately.

14. The elevator drive according to claim 9 including at least one brake lever switch for monitoring a position of the brake levers.

15. The elevator drive according to claim 14 including a switching member for comparing a signal that energizes the at least one brake magnet with a signal of said at least one brake lever switch and on circuit-logical inequality generates an error signal for an elevator control.

* * * * *